United States Patent
Lin (10) Patent No.: US 12,259,618 B1
(45) Date of Patent: Mar. 25, 2025

(54) DISPLAY PANEL AND DISPLAY MODULE HAVING META STRUCTURE LAYER IN PERIPHERAL DISPLAY AREA

(71) Applicant: Shenzhen China Star Optoelectronics Semiconductor Display Technology Co., Ltd., Guangdong (CN)

(72) Inventor: Yunpeng Lin, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/526,162

(22) Filed: Dec. 1, 2023

(30) Foreign Application Priority Data

Aug. 29, 2023 (CN) .......................... 202311114334.7

(51) Int. Cl.
G02F 1/1343 (2006.01)
(52) U.S. Cl.
CPC .... *G02F 1/134309* (2013.01); *G02F 2202/30* (2013.01)
(58) Field of Classification Search
None
See application file for complete search history.

(56) References Cited

U.S. PATENT DOCUMENTS

| | | | | |
|---|---|---|---|---|
| 2006/0238440 | A1* | 10/2006 | Kim | G02F 1/133526 345/1.1 |
| 2014/0160383 | A1* | 6/2014 | Shikii | G02B 26/0841 349/1 |
| 2021/0349311 | A1* | 11/2021 | Hoshino | B60K 37/00 |
| 2024/0085748 | A1* | 3/2024 | Huang | H01L 25/0753 |

\* cited by examiner

*Primary Examiner* — Ryan Crockett
(74) *Attorney, Agent, or Firm* — PV IP PC; Wei Te Chung (57) ABSTRACT

A display panel and a display module are provided. The display panel includes a non-display area, a central display area, and a peripheral display area arranged between the two areas. A counterpart substrate is arranged opposite to an array substrate, with a liquid crystal layer positioned between the array substrate and the counterpart substrate. A meta-surface structure layer of the counterpart substrate is arranged in the peripheral display area. Light emitted from the peripheral display area is at least partially deflected by the meta-surface structure layer and then emerges from the non-display area. The meta-surface structure layer in the peripheral display area alters the propagation path of light, allowing at least part of the light emitted from the peripheral display area to enter the non-display area. This approach overcomes the limitations imposed by a frame, enlarges the display area of the display panel, and achieves a narrow-frame display panel.

19 Claims, 8 Drawing Sheets

DISPLAY PANEL AND DISPLAY MODULE HAVING META STRUCTURE LAYER IN PERIPHERAL DISPLAY AREA

CROSS-REFERENCE TO RELATED APPLICATION

This application claims the benefit of priority of Chinese Patent Application No. 202311114334.7, filed on Aug. 29, 2023, the disclosure of which is incorporated herein by reference in its entirety.

FIELD OF DISCLOSURE

The present application relates to a field of display technology, specifically relating to a display panel and a display module.

DESCRIPTION OF RELATED ART

Backlit display modules include a backlight module and a display panel having a liquid crystal layer. The display panel and the backlight module require installation and protection via a frame. However, the presence of the frame restricts the development of large-sized display panels towards narrow frame designs.

Thus, overcoming the limitations imposed by the frame to achieve narrow frame/bezel displays in display panels has become a pressing technical challenge in this field.

SUMMARY OF INVENTION

The present application provides a display panel and a display module that can overcome the limitations imposed by a frame, thereby enlarging a display area of the display panel.

In a first aspect, the present application provides a display panel, with a non-display area, a central display area, and a peripheral display area between the non-display area and the central display area, the display panel including:
an array substrate;
a counterpart substrate, arranged opposite to the array substrate; and
a liquid crystal layer, provided between the array substrate and the counterpart substrate;
wherein the counterpart substrate includes a base substrate and a meta-surface structure layer, the meta-surface structure layer is disposed on one side of the base substrate close to the liquid crystal layer and is located in the peripheral display area, and at least part of light emitted from the peripheral display area is deflected by the meta-surface structure layer and then emerges from the non-display area.

In the display panel of the present application, the counterpart substrate includes a counterpart electrode layer;
the counterpart electrode layer is disposed on one side of the meta-surface structure layer away from the base substrate, or the counterpart electrode layer is disposed on one side of the meta-surface structure layer close to the base substrate.

In the display panel of the present application, the peripheral display area includes a first peripheral sub-display area and a second peripheral sub-display area between the central display area and the first peripheral sub-display area;
the meta-surface structure layer includes a plurality of meta-surface structure units, each of the meta-surface structure units includes a deflection angle relative to a first direction, the first direction is a direction perpendicular to a second direction, the second direction is a direction along a boundary line between the central display area and the second peripheral sub-display area;
along a direction from the second peripheral sub-display area to the first peripheral sub-display area, the deflection angles of the meta-surface structure units located in the first peripheral sub-display area gradually increase; and
along a direction from the first peripheral sub-display area to the second peripheral sub-display area, the deflection angles of the meta-surface structure units located in the second peripheral sub-display area gradually increase.

In the display panel of the present application, in the first peripheral sub-display area, the deflection angles of the meta-surface structure units located in a same column are equal; and/or in the second peripheral sub-display area, the deflection angles of the meta-surface structure units located in a same column are equal;
wherein the meta-surface structure units in the same column are arranged along the second direction.

In the display panel of the present application, along the first direction, an absolute difference in the deflection angles between each two neighboring meta-surface structure units are equal.

In the display panel of the present application, along the second direction, the meta-surface structure units are arranged at equal intervals; and/or along the first direction, the meta-surface structure units are arranged at equal intervals; and/or the meta-surface structure units are arranged axially symmetrically with respect to a boundary line between the first peripheral sub-display area and the second peripheral sub-display area.

In the display panel according to the present application, a cross-section of each of the meta-surface structure units, parallel to a plane where the display panel is located, is rectangular-shaped, and/or
a cross-section of each of the meta-surface structure units, parallel to the plane where the display panel is located, is in a shape of two perpendicularly intersecting rectangles.

In the display panel of the present application, the meta-surface structure units include a plurality of first meta-surface sub-units and a plurality of second meta-surface sub-units; a cross-section of each of the first meta-surface sub-units, parallel to the plane where the display panel is located, is rectangular-shaped; a cross-section of each of the second meta-surface sub-units, parallel to the plane where the display panel is located, is in a shape of two perpendicularly intersecting rectangles; along the second direction, at least one of the first meta-surface sub-unit and at least one of the second meta-surface sub-units are alternately arranged at intervals; and along the first direction, the cross-sections of the meta-surface structure units are either all rectangular-shaped or all in the shape of two perpendicularly intersecting rectangles.

In a second aspect, this application also provides a display module, which includes any of the aforementioned types of display panels, a frame, and a light-refracting member. The display panel is located within the frame, and the light-refracting member is disposed on the frame and located in the non-display area. At least part of the light emitted from the peripheral display area passes through the light-refracting member and is then refracted to emerge from the non-display area.

In the display module of the present application, the light-refracting member extends along a third direction; the third direction is a boundary line between the peripheral display area and the non-display area; and a cross-sectional shape of the light-refracting member, perpendicular to the third direction, is at least one of triangular, triangular-like, trapezoidal, or trapezoidal-like.

The display panel provided in the present application enhances the display area by positioning a meta-surface structure layer in the peripheral display area to alter a path of light emitted from the peripheral display area. This design allows at least part of the light emitted from the peripheral display area to enter the non-display area, thereby overcoming the limitations imposed by the frame and achieving a narrow-frame/narrow-bezel display panel.

DETAILED DESCRIPTION OF EMBODIMENTS

The technical solutions in the embodiments of the present application are described in conjunction with the accompanying drawings. The described embodiments are only intended to explain the inventive concept of the present application and should not be considered a limitation to the protection scope of the application.

Figure 1:
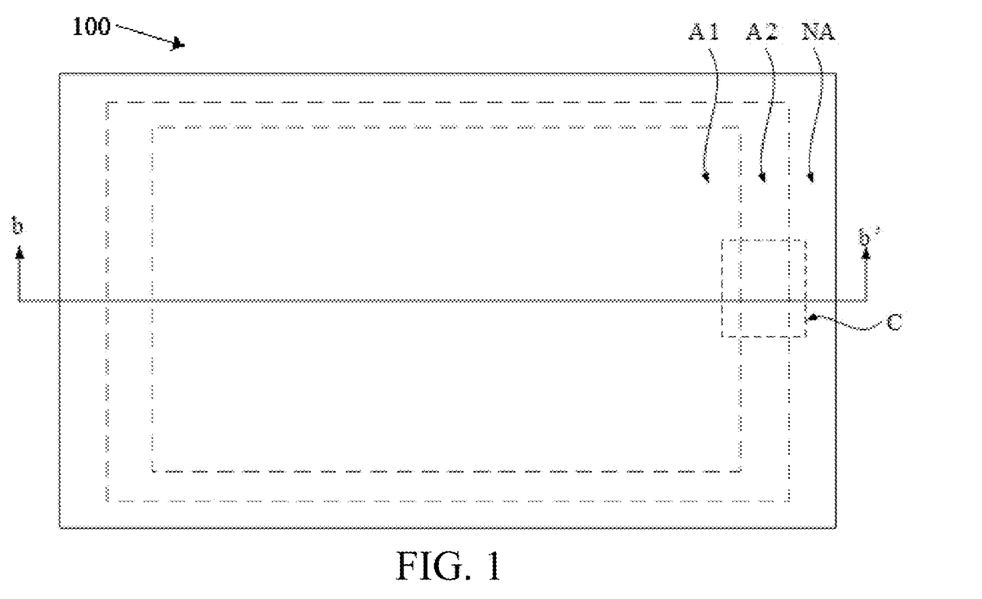
FIG. 1 is a planar schematic view of a display panel according to one embodiment of the present application.

As shown in FIG. 1, the display panel 100 provided in the embodiment of this application has a non-display area NA, a peripheral display area A2, and a central display area A1. The peripheral display area A2 is located between the non-display area NA and the central display area A1. The peripheral display area A2 surrounds the central display area A1, while the non-display area NA surrounds the peripheral display area A2.

Figure 2:
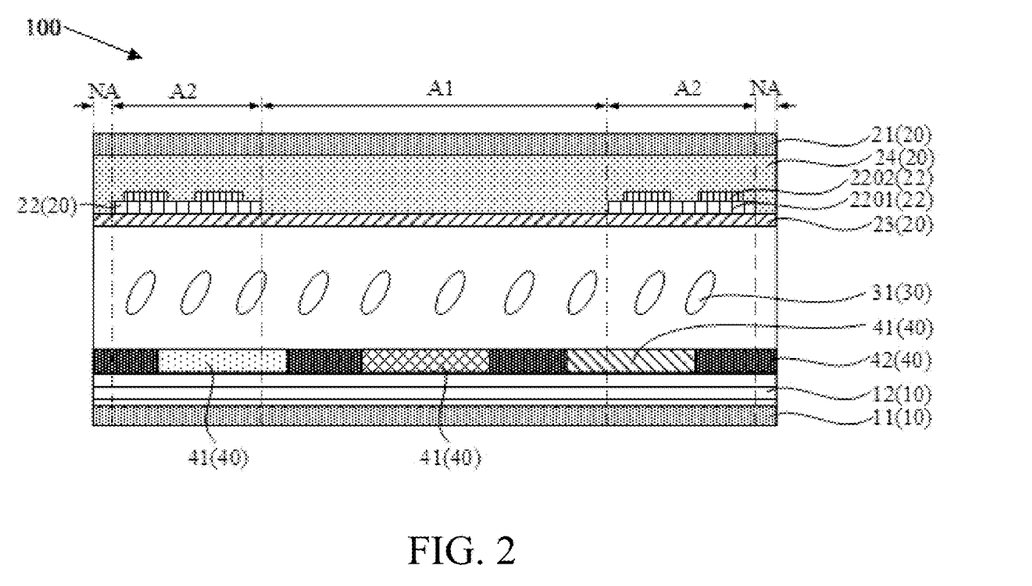
FIG. 2 is a first schematic structural view of the display panel, along a b-b' direction in FIG. 1, according to one embodiment of the present application.

As shown in FIGS. 1 and 2, the display panel includes an array substrate 10, a counterpart substrate 20, and a liquid crystal layer 30.

The array substrate 10 is used for arranging thin-film transistors and can include an array base 11 and a driving layer 12 disposed on one side of the array base 11 close to the liquid crystal layer 30. The thin-film transistors are arranged in the driving layer 12.

The counterpart substrate 20 is disposed opposite to the array substrate 10, meaning the counterpart substrate 20 serves as an opposite electrode substrate to the array substrate 10.

The liquid crystal layer 30 is located between the array substrate 10 and the counterpart substrate 20. The liquid crystal layer 30 includes multiple liquid crystal molecules 31, which change orientation under the influence of external voltage, etc. Based on the orientation change of these liquid crystal molecules 31, linearly polarized light undergoes a transition of passing through or being blocked, functioning as a liquid crystal shutter.

The counterpart substrate 20 includes a base substrate 21 and a meta-surface structure layer 22. The meta-surface structure layer 22 is disposed on one side of the base substrate 21 close to the liquid crystal layer 30 and is located in the peripheral display area A2. The meta-surface structure layer 22 is composed of multiple sub-wavelength-sized meta-surface structure units 221 periodically or non-periodically arranged on a two-dimensional plane. The meta-surface structure layer 22 located in the peripheral display area A2 deflects at least part of the light incident on the meta-surface structure layer 22 to the non-display area NA, thereby changing a polarization path of the light emitted from the peripheral display area A2 and directing at least some of the light from the peripheral display area A2 into the non-display area NA.

In this embodiment, the display panel 100 also includes a pixel layer 40, as shown in FIG. 2. The pixel layer 40 is disposed on the array substrate 10 and is positioned between the liquid crystal layer 30 and the array substrate 10. The pixel layer 40 includes pixel openings surrounded by a black matrix 42, and pixel units 41 including color filter films correspondingly disposed in the pixel openings. The color filter films in the pixel units 41 can be a first color filter film, such as a red filter film that only allows red light to pass through, a second color filter film, such as a green filter film that only allows green light to pass through, and a third color filter film, such as a blue filter film that only allows blue light to pass through. The central display area A1 have pixel units 41 across the entire area, and the peripheral display area A2 includes the pixel units 41 in at least part of the peripheral display area A2.

Since the pixel layer 40 is disposed on the array substrate 10 in this embodiment, i.e., the color filter films are coated on the completed array substrate 10 to form the pixel layer 40, the display panel 100 of this embodiment is a color-filter-on-array (COA) display panel. Compared to non-COA display panels, COA display panels have relatively low parasitic capacitance, a relatively high aperture ratio, and can relatively alleviate the problem of uneven brightness (Mura) in a display screen.

As shown in FIG. 2, the counterpart substrate 20 also includes a counterpart electrode layer 23, positioned on one side of the meta-surface structure layer 22 close to the base substrate 21. The array substrate 10 is provided with a transparent electrode layer (not illustrated), forming pixel electrodes on the array substrate 10. The counterpart substrate 20 also includes the counterpart electrode layer 23, forming counterpart electrodes on the counterpart substrate 20. A voltage signal corresponding to image data is applied between the pixel electrode and the counterpart electrode to provide a liquid crystal shutter function in the liquid crystal layer 30. Since both the pixel electrode and the counterpart electrode need to be transparent while functioning as electrodes, the counterpart electrode layer 23 must be composed of transparent electrodes, for instance, made of tin indium oxide.

Figure 3:
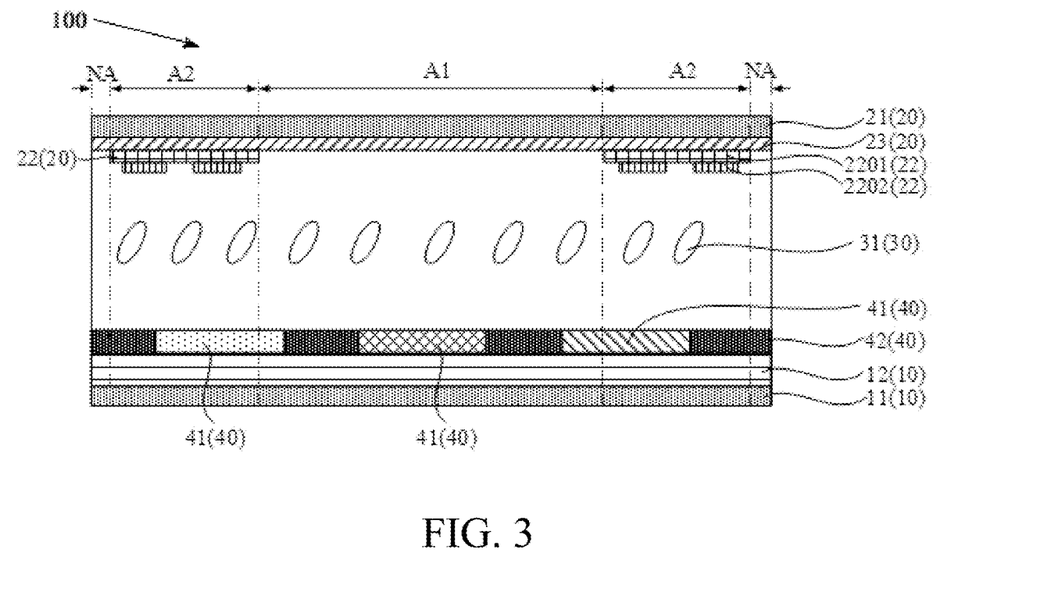
FIG. 3 is a second schematic structural view of the display panel, along the b-b' direction in FIG. 1, according to one embodiment of the present application.

As shown in FIG. 2, the meta-surface structure layer 22 can be positioned on one side of the counterpart electrode layer 23 away from the liquid crystal layer 30. As shown in FIG. 3, the meta-surface structure layer 22 can also be disposed on one side of the counterpart electrode layer 23 close to the liquid crystal layer 30. Compared to positioning the meta-surface structure layer 22 near the liquid crystal layer 30 on the counterpart electrode layer 23, positioning the meta-surface structure layer 22 away from the liquid crystal layer 30 allows different colors of light to pass through the counterpart electrode layer 23 and then through the meta-surface structure layer 22 to change light propagation path. This reduces the color differences caused by different light path lengths due to refractive index differences among red, green, and blue light.

As shown in FIG. 2, since the counterpart electrode layer 23 is placed on one side of the meta-surface structure layer 22 away from the base substrate 21, the counterpart substrate 20 can also include a planarization layer 24. The planarization layer 24 is positioned on one side of the meta-surface structure layer 22 close to the base substrate 21, serving as a support layer for the meta-surface structure layer 22 and filling gaps caused by the placement of the meta-surface structure layer 22 in the counterpart substrate 20. The planarization layer 24 can be made of transparent and insulating materials such as polyimide resin, polyvinyl alcohol resin, epoxy resin, or acrylic resin.

As shown in FIG. 3, since the counterpart electrode layer 23 is positioned on one side of the meta-surface structure layer 22 close to the base substrate 21, there is no need for having a planarization layer to fill the gaps caused by the placement of the meta-surface structure layer 22 in the counterpart substrate 20.

Figure 4:
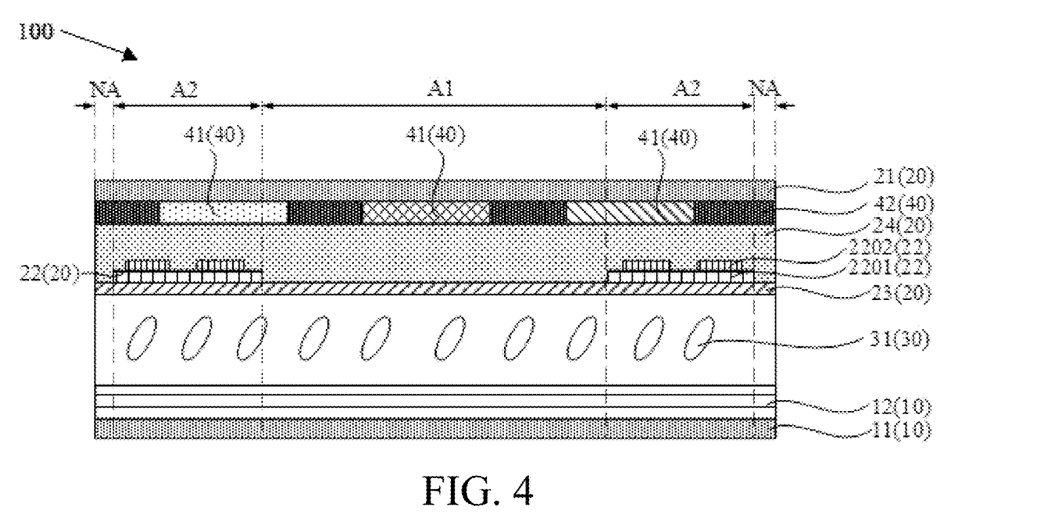
FIG. 4 is a third schematic structural view of the display panel, along the b-b' direction in FIG. 1, according to one embodiment of the present application.

As shown in FIGS. 2 and 4, a difference between FIGS. 4 and 2 is that the pixel layer 40 is placed in the counterpart substrate 20 and is located on one side of the meta-surface structure layer 22 close to the base substrate 21. As the pixel layer 40 is placed in the counterpart substrate 20 opposite the array substrate 10, the counterpart substrate 20 is also referred to as a color filter (CF) substrate.

Similar to the configuration of the counterpart electrode layer 23 shown in FIG. 2, in the display panel 100 shown in FIG. 4, the counterpart electrode layer 23 is positioned on one side of the meta-surface structure layer 22 away from the base substrate 21, meaning the meta-surface structure layer 22 is between the counterpart electrode layer 23 and the pixel layer 40. Since the counterpart electrode layer 23 is positioned on one side of the meta-surface structure layer 22 away from the base substrate 21, there are gaps between the meta-surface structure layer 22 and the pixel layer 40. Therefore, the planarization layer 24 can be positioned on one side of the pixel layer 40 away from the base substrate 21, serving as a support layer for the meta-surface structure layer 22 and filling the gaps between the meta-surface structure layer 22 and the pixel layer 40.

In contrast to the configuration shown in FIG. 4, where the counterpart electrode layer 23 is placed on one side of the meta-surface structure layer 22 away from the base substrate 21, other embodiments of this application may position the counterpart electrode layer 23 on one side close to the base substrate 21. This means the counterpart electrode layer 23 is located between the meta-surface structure layer 22 and the pixel layer 40. As a result, at least part of the light from the peripheral display area A2 first passes through the meta-surface structure layer 22 in the peripheral display area A2, altering its deflection path, then passes through the pixel layer 40, and emerges into the non-display area NA. This changes the polarization path of the light emitted from the peripheral display area A2, allowing at least some of the light from the peripheral display area A2 to enter the non-display area NA, thereby enlarging the display area of the display panel 100 and achieving a narrow-framed design for the display panel 100.

Figure 5:
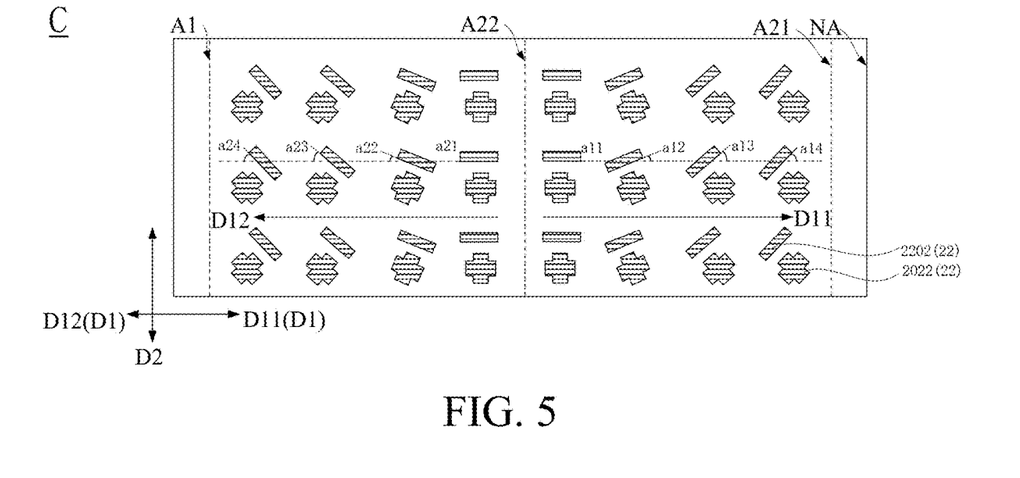
FIG. 5 is a first partial structural top view of a meta-surface structure layer at position C of FIG. 1.

As illustrated in FIG. 5, the peripheral display area A2 includes a first peripheral sub-display area A21 and a second peripheral sub-display area A22, with the second peripheral sub-display area A22 located between the central display area A1 and the first peripheral sub-display area A21.

Figure 6:
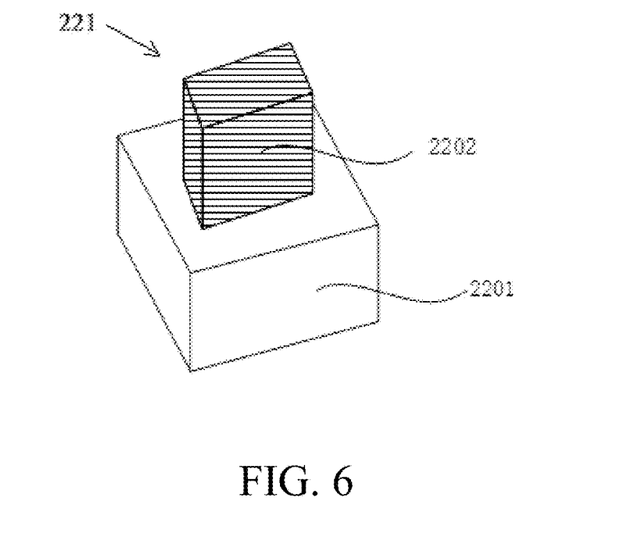
FIG. 6 is an isometric structural view of a meta-surface structure unit in FIG. 5.

As shown in FIGS. 5 and 6, the meta-surface structure layer 22 includes multiple meta-surface structure units 221. Each meta-surface structure unit 221 includes a sub-substrate 2201 and an anisotropic sub-wavelength structure 2202 disposed on the sub-substrate 2201. A material of the sub-substrate 2201 can be transparent materials such as silicon, glass, or indium tin oxide. A thickness of the sub-substrate 2201 can range from 2 micrometers to 4 micrometers, for example, can be 2 micrometers, 2.5 micrometers, 3 micrometers, 3.5 micrometers, or 4 micrometers. A material of the sub-wavelength structure 2202 can be metal oxide materials such as titanium oxide. A height of the sub-wavelength structure 2202 can range from 800 nanometers to 1200 nanometers, for instance, can be 800 nanometers, 850 nanometers, 900 nanometers, 950 nanometers, 1000 nanometers, 1050 nanometers, 1100 nanometers, 1150 nanometers, or 1200 nanometers. The height of the sub-wavelength structure 2202, ranging from 800 nanometers to 1200 nanometers, allows the meta-surface structure units 221 to achieve large-angle polarization of light, causing more light from the peripheral display area A2 to change its propagation path and emerge into the non-display area NA. This enlarges the display area of the display panel 100 and realizes a narrow-framed design for the display panel 100.

Each meta-surface structure unit 221 has a deflection angle relative to a first direction D1, where the first direction D1 is perpendicular to a second direction D2, and the second direction D2 is a direction along a boundary line between the central display area A1 and the second peripheral sub-display area A22. The deflection angle is an angle between a long axis of the sub-wavelength structure 2202 and a polarization direction of the linearly polarized light entering the sub-wavelength structure 2202.

Figure 7A:
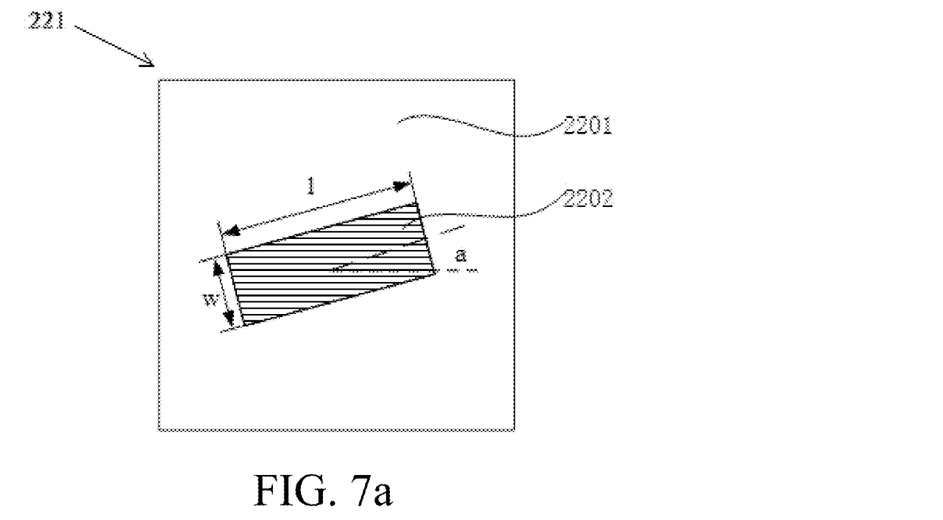
FIG. 7a is a top structural view of the meta-surface structure unit in FIG. 6.
Figure 7B:
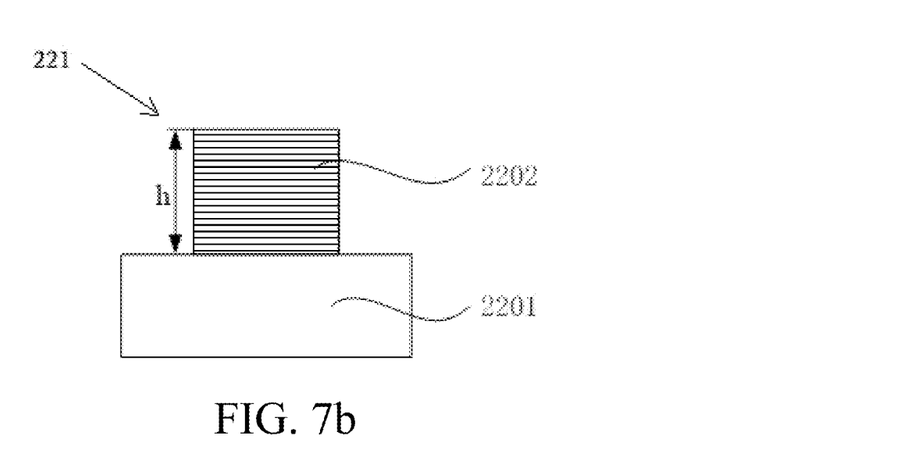
FIG. 7b is a side structural view of the meta-surface structure unit in FIG. 6.

As illustrated in FIGS. 6 to 7b, the meta-surface structure units 221 can be characterized as columnar or columnar-like nanostructures with a rectangular cross-section, having a height h, a width w, a length l, and a deflection angle a. However, in some embodiments, the meta-surface structure units 221 forming the meta-surface structure layer 22 can include other types of nanostructures, such as nanocolumns which may have a circular or elliptical cross-sectional columnar or columnar-like nanostructure.

According to the Berry's geometric phase principle, the interaction between circularly polarized light and the anisotropic sub-wavelength structure 2202 can reverse the circular polarization state of the incident light while introducing a geometric phase factor $e^{-2i\sigma\varphi}$. In this geometric phase factor, i is the complex amplitude, $\sigma$ is the circular polarization state of the incident light, and $\sigma=\pm 1$, and $\varphi$ is the deflection angle of the anisotropic sub-wavelength structure 2202 in the plane. The positive and negative of the circular polarization state σ of the incident light is determined by the polarization direction of the incident light and the polarization direction of the transmitted light. If the incident light is right-circularly polarized and the transmitted light is left-circularly polarized, then the circular polarization state of the incident light is positive, in this case, σ=−1; if the incident light is left-circularly polarized and the transmitted light is right-circularly polarized, then the circular polarization state of the incident light is negative, in this case, σ=+1.

Since the geometric phase factor is related to the circular polarization state of the incident light and the deflection angle of the anisotropic sub-wavelength structure 2202 in the plane, changing the deflection angle of the anisotropic sub-wavelength structure 2202 can achieve continuous control of the phase of the incident light from 0 to 2π, and the phase changes caused by the incident light of different circular polarization states have opposite signs (i.e., positive and negative). The linearly polarized light incident on the sub-wavelength structure 2202 can be decomposed into left and right circularly polarized light. The left and right circularly polarized light undergo phase changes of equal magnitude and opposite sign through the sub-wavelength structure 2202, and their combination can again form linearly polarized light, with the polarization direction of the linearly polarized light being 2φ. Therefore, adjusting the deflection angle of the anisotropic sub-wavelength structure 2202 can achieve control over the polarization direction of the linearly polarized light incident on the sub-wavelength structure, and the deflection angle of the sub-wavelength structure is related to the long axis of the sub-wavelength structure and the polarization direction of the linearly polarized incident light. Therefore, when the polarization direction of the linearly polarized incident light is fixed, according to the required distribution of the linear polarization state of the emitted light, by arranging the sub-wavelength structures, the polarization direction of the linearly polarized incident light can be controlled, making the light emitted from the sub-wavelength structure meet the required distribution of the linear polarization state for the emitted light.

In a direction from the second peripheral sub-display area A22 to the first peripheral sub-display area A21, the deflection angles of the meta-surface structure units 221 located in the first peripheral sub-display area A21 gradually increase. As shown in FIG. 5, the relationship of the deflection angles is a11<a12<a13<a14. The closer the sub-wavelength structure 2202 is to the non-display area NA, the larger its deflection angle, resulting in a larger angle of deflection of the linearly polarized light emitted from this sub-wavelength structure 2202 towards the non-display area NA. Therefore, more light enters the non-display area NA, enlarging the display area of the display panel 100.

Along a direction from the first peripheral sub-display area A21 towards the second peripheral sub-display area A22, the deflection angles of the meta-surface structure units 221 located in the second peripheral sub-display area A22 gradually increase. As shown in FIG. 5, the relationship of the deflection angles is a21<a22<a23<a24. The closer the sub-wavelength structure 2202 is to the central display area A1, the larger its deflection angle, resulting in a larger angle of deflection of the linearly polarized light emitted from this sub-wavelength structure 2202 towards the central display area A1. Therefore, more light remains in the peripheral display area A2, thus maintaining normal display in the peripheral display area A2.

Figure 8:
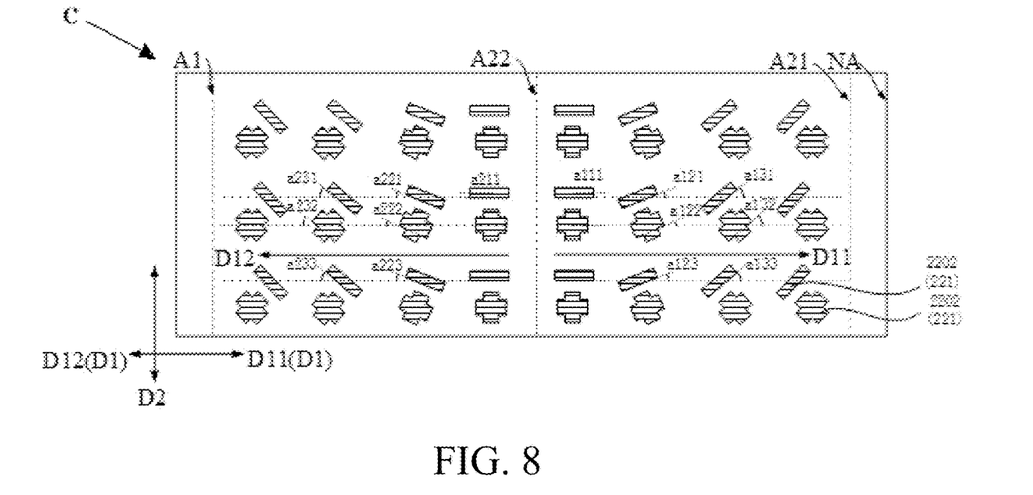
FIG. 8 is a second partial structural top view of the meta-surface structure layer at position C of FIG. 1.

As shown in FIG. 8, within the first peripheral sub-display area A21, the meta-surface structure units 221 in the same column are arranged along the second direction D2, and the deflection angles of the meta-surface structure units 221 in the same column are equal, i.e., a121=a122=a123, a131=a132=a133. Here, the second direction D2 is a direction along the boundary line between the central display area A1 and the second peripheral sub-display area A22. In some embodiments provided in this application, within the second peripheral sub-display area A22, the meta-surface structure units 221 in the same column are arranged along the second direction D2, and the deflection angles of the meta-surface structure units 221 in the same column are equal, i.e., a221=a222=a223, a231=a232=a233. In some embodiments of this application, the deflection angles of the meta-surface structure units 221 in the same column in the first peripheral sub-display area A21 are equal, and the deflection angles of the meta-surface structure units 221 in the same column in the second peripheral sub-display area A22 are equal.

Because in the direction along the boundary line between the central display area A1 and the second peripheral sub-display area A22, i.e., along the second direction D2, the deflection angles of the meta-surface structure units 221 in the same column are the same, according to the previously mentioned Berry's geometric phase principle, the polarization direction of the linearly polarized light emitted from the meta-surface structure units 221 with the same deflection angle is consistent. Thus, in the direction along the boundary line between the central display area A1 and the second peripheral sub-display area A22, there is good uniformity in brightness in both the peripheral display area A2 and the non-display area NA.

As shown in FIG. 8, along the first direction D1, an absolute difference in the deflection angles between two adjacent meta-surface structure units 221 is equal to an absolute difference in the deflection angles between another two adjacent meta-surface structure units 221. For example, in the first peripheral sub-display area A21, along the first direction D1, the deflection angles of two adjacent meta-surface structure units 221 are a111 and a121, respectively, with the absolute value of the difference in their deflection angles being |a111-a121|. The deflection angles of another two adjacent meta-surface structure units 221 are a121 and a131, respectively, with the absolute value of the difference in their deflection angles being |a121-a131|, hence |a111-a121| is equal in magnitude to |a121-a131|. This means along the first direction D1, in the first peripheral sub-display area A21, the magnitude of the deflection angles of the meta-surface structure units 221 increases in an arithmetic sequence, so as to adjust the polarization direction of the linearly polarized light emitted from the meta-surface structure units 221, thereby providing good uniformity in brightness along the first direction D1 in both the peripheral display area A2 and the non-display area NA.

The magnitude of the difference in the deflection angles between two adjacent meta-surface structure units 221 arranged along the first direction D1 can be determined based on the number of the meta-surface structure units 221 and the size of the peripheral display area A2. A range of the deflection angles should be controlled between 0° and 90°. For example, if the meta-surface structure units 221 in the first peripheral sub-display area A21 are arranged in an n-row by m-column array, then the deflection angles of the first column of the meta-surface structure units 221 closest to the second peripheral sub-display area A22 can be 0°, and the deflection angles of the m-th column of the meta-surface structure units 221 farthest from the second peripheral sub-display area A22 could be 90°, where n and m are integers greater than 1, and n and m can be equal or different. Similarly, if the meta-surface structure units 221 in the second peripheral sub-display area A22 are arranged in an n-row by m-column array, then the deflection angles of the first column of the meta-surface structure units 221 closest to the first peripheral sub-display area A21 can be 0°, and the deflection angles of the m-th column of the meta-surface structure units 221 farthest from the first peripheral sub-display area A21 can be 90°, where n and m are integers greater than 1, and n and m can be equal or different.

Figure 9:
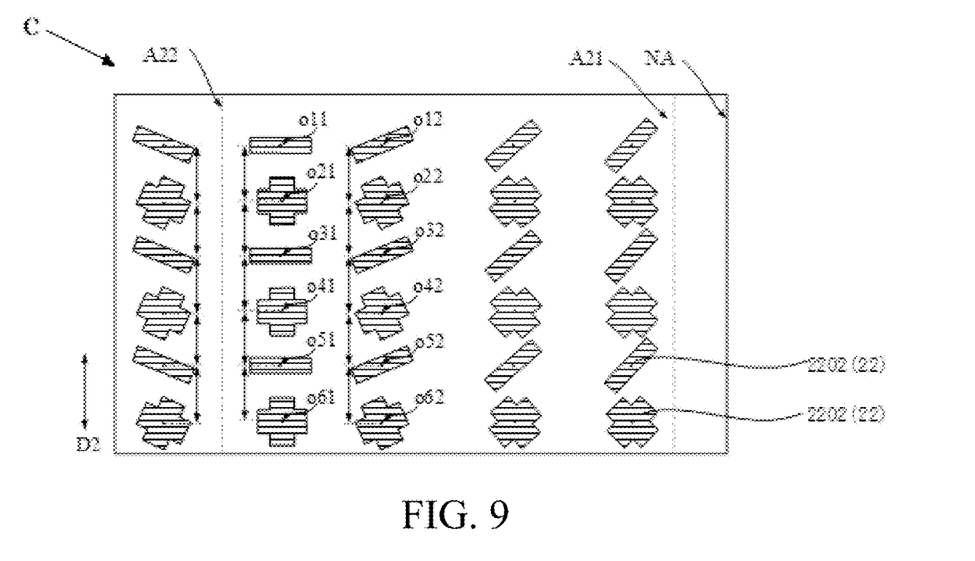
FIG. 9 is a third partial structural top view of the meta-surface structure layer at position C of FIG. 1.

Along the second direction D2, the meta-surface structure units 221 are arranged at equal intervals. That is, in the direction along the boundary line between the central display area and the second peripheral sub-display area, a distance between two adjacent meta-surface structure units 221 is equal to a distance between another two adjacent meta-surface structure units 221. The distance between two adjacent meta-surface structure units 221 refers to a distance between a geometric center o of one of the meta-surface structure units 221 and a geometric center o of another adjacent meta-surface structure unit 221. As shown in FIG. 9, the distances between o11 and o21, o21 and o31, o31 and o41, o41 and o51, o51 and o61 are equal, and the distances between o12 and o22, o22 and o32, o32 and o42, o42 and o52, and o52 and o62 are equal.

Figure 10:
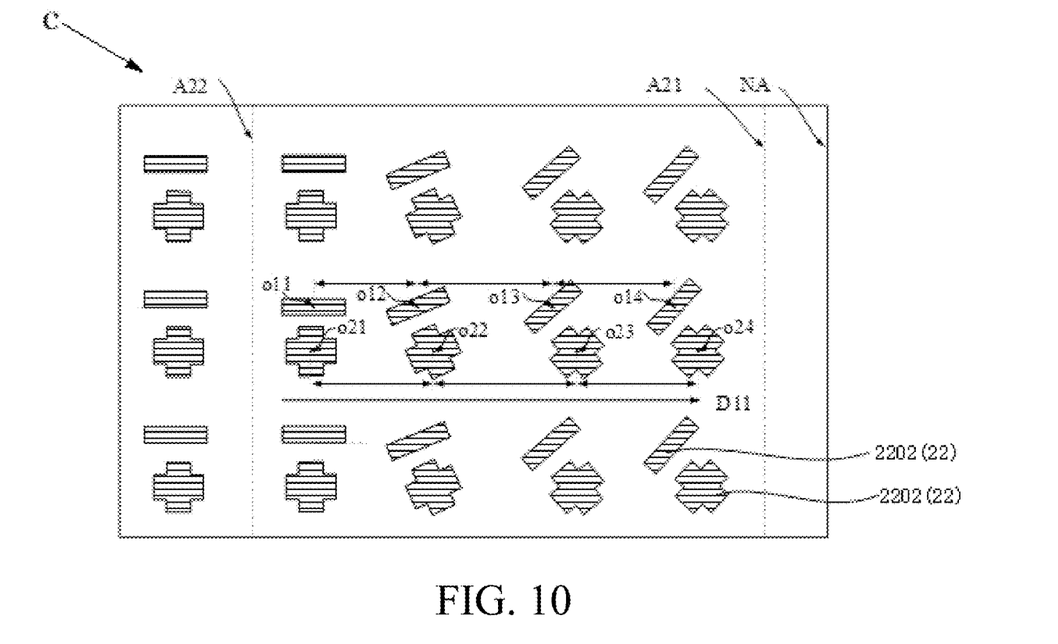
FIG. 10 is a fourth partial structural top view of the meta-surface structure layer at position C of FIG. 1.

Along the first direction D1, the meta-surface structure units 221 are arranged at equal intervals, meaning a distance between two adjacent meta-surface structure units 221 is the same as a distance between another two adjacent units. The distance between two adjacent meta-surface structure units 221 refers to a distance between a geometric center o of one of the meta-surface structure units 221 and a geometric center o of another adjacent meta-surface structure unit 221. As shown in FIG. 10, the distances between o11 and o12, o12 and o13, and o13 and o14 are equal. Similarly, the distances between o21 and o22, o22 and o23, and o23 and o24 are equal.

In other embodiments, along the second direction D2, the meta-surface structure units 221 are arranged at equal intervals, and the meta-surface structure units 221 are also arranged at equal intervals along the first direction D1.

Figure 11:
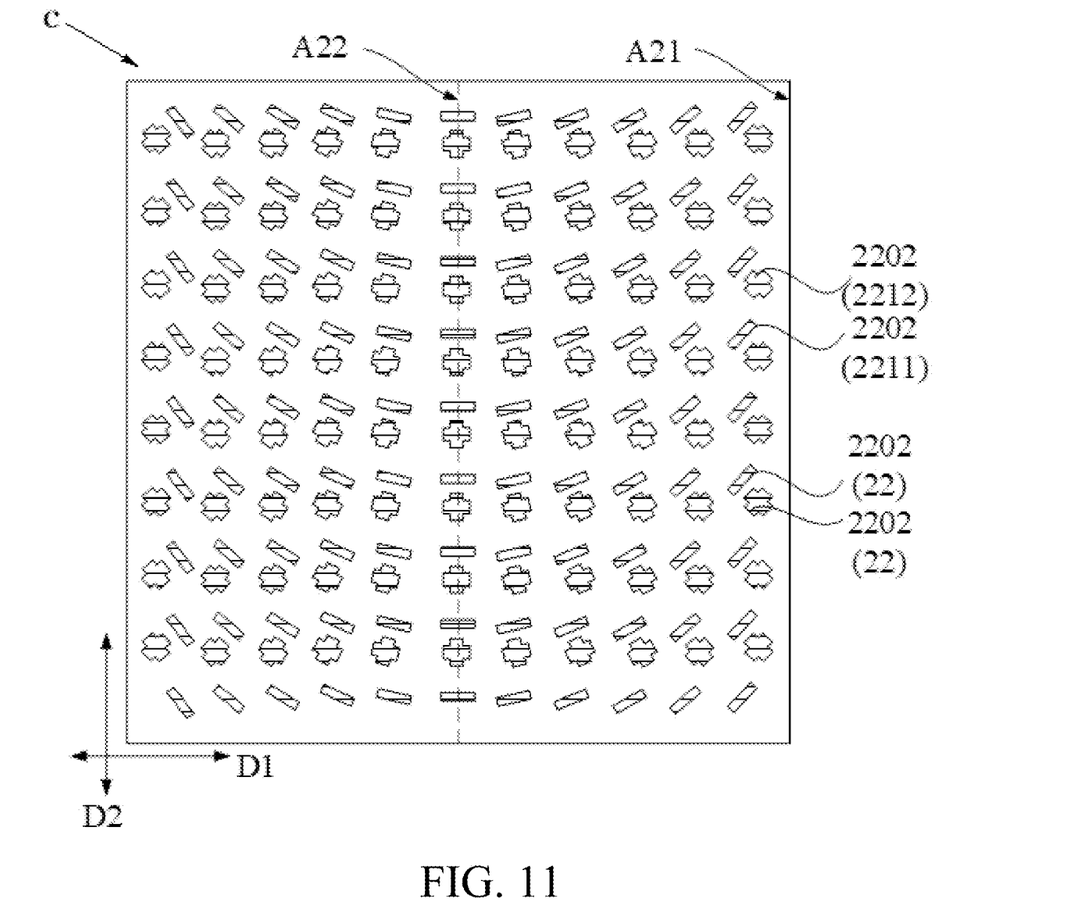
FIG. 11 is a fifth partial structural top view of the meta-surface structure layer at position C of FIG. 1.

As shown in FIG. 11, the meta-surface structure units 221 are arranged in an axially symmetrical setup with respect to a boundary line between the first peripheral sub-display area A21 and the second peripheral sub-display area A22. In this embodiment, for each meta-surface structure unit 221 located in the first peripheral sub-display area A21, there is a corresponding meta-surface structure unit 221 in the second peripheral sub-display area A22, and the geometric centers of the two corresponding meta-surface structure units 221 are equidistant from the boundary line between the first peripheral sub-display area A21 and the second peripheral sub-display area A22. The two corresponding meta-surface structure units 221 have identical sub-wavelength structures 2202, the same deflection angles, but their directions of deflection are opposite.

As shown in FIGS. 2 to 11, a cross-section of the meta-surface structure units 221, parallel to the plane where the display panel 100 is located, is either rectangular or includes two perpendicularly intersecting rectangles.

The cross-section of the meta-surface structure unit 221 parallel to the plane of the display panel 100 being rectangular means that the sub-wavelength structure 2202 of the meta-surface structure unit 221 has a rectangular cross-section parallel to the plane of the display panel 100. Such a meta-surface structure unit 221 with a rectangular cross-section acts as a single refraction phase control unit. The cross-section of the meta-surface structure unit 221 can be characterized by a width w1 and a length l1, with the length l1 extending in the direction of the long axis of the rectangular meta-surface structure unit 221.

The cross-section of the meta-surface structure unit 221, parallel to the plane of the display panel 100, including two perpendicularly intersecting rectangles means that the cross-section of the sub-wavelength structure 2202 of the meta-surface structure unit 221, parallel to the plane of the display panel 100, consists of two rectangles intersecting at right angles. The meta-surface structure unit 221 acts as a dual refraction phase control unit, where the cross-section of the meta-surface structure unit 221 is formed by a first rectangle with a width w21 and a length l21 intersecting perpendicularly with a second rectangle having a width w22 and a length l22. An extension direction of the length l21 is a first long axis direction of the meta-surface structure unit 221, and the extension direction of length l22 is a second long axis direction of the meta-surface structure unit 221. When linearly polarized light is incident on the meta-surface structure unit 221, the reflected light's phase for polarization components along the first and second long axis directions differ by $\pi/2$. The first long axis direction corresponds to a fast axis of the birefringence effect, and the second long axis direction corresponds to a slow axis of the birefringence effect. The reflected light is deflected at a fixed angle $\beta$ in the direction of the slow axis and the direction of the fast axis. On the plane where the display panel 100 is located, by rotating the meta-surface structure unit 221 with the cross-section including two perpendicularly intersecting rectangles around a geometric center of the meta-surface structure unit 221, the direction of the fast axis can be changed. This changes the deflection angle of the meta-surface structure unit 221 with the cross-sectional shape consisting of two perpendicularly intersecting rectangles, i.e., an angle between the first long axis direction of the meta-surface structure unit 221 and the first direction D1, thereby controlling the polarization direction of the linearly polarized light emitted from the meta-surface structure unit 221.

As shown in FIG. 11, the meta-surface structure units 221 include first meta-surface sub-units 2211 and second meta-surface sub-units 2212. A cross-section of the first meta-surface sub-unit 2211, parallel to the plane of display panel 100, is rectangular, while a cross-section of the second meta-surface sub-unit 2212, parallel to the plane of the display panel 100, consists of two perpendicularly intersecting rectangles. Along the second direction D2, at least one first meta-surface sub-unit 2211 and at least one second meta-surface sub-unit 2212 are alternately arranged at intervals. Along the first direction D1, the cross-sections of the meta-surface structure units 221, parallel to the plane of display panel 100, are either all rectangular or all include two perpendicularly intersecting rectangles. By combining the single-refraction phase control units and the dual-refraction phase control units, the polarization direction of linearly polarized light in the peripheral display area A2 is controlled, achieving continuous control of the phase of incident light from 0 to $2\pi$. This configuration directs light incident on the meta-surface structure layer 22 to an edge area, expanding the display area of display panel 100, and realizing a narrow-frame display for display panel 100. Additionally, when linearly polarized light is deflected by the meta-surface structure layer 22 into the non-display area NA, the diffraction effect of the linearly polarized light is significant. Due to the different propagation speeds of different wavelengths of light in the medium, color differences may occur in certain areas, affecting the display effect in the peripheral display area A2. Therefore, this embodiment designs the shape and size of the meta-surface structure units to precisely control the light path of different wavelengths of light passing through the meta-surface structure, improving color differences in the peripheral display area A2 and the non-display area NA.

Figure 12:
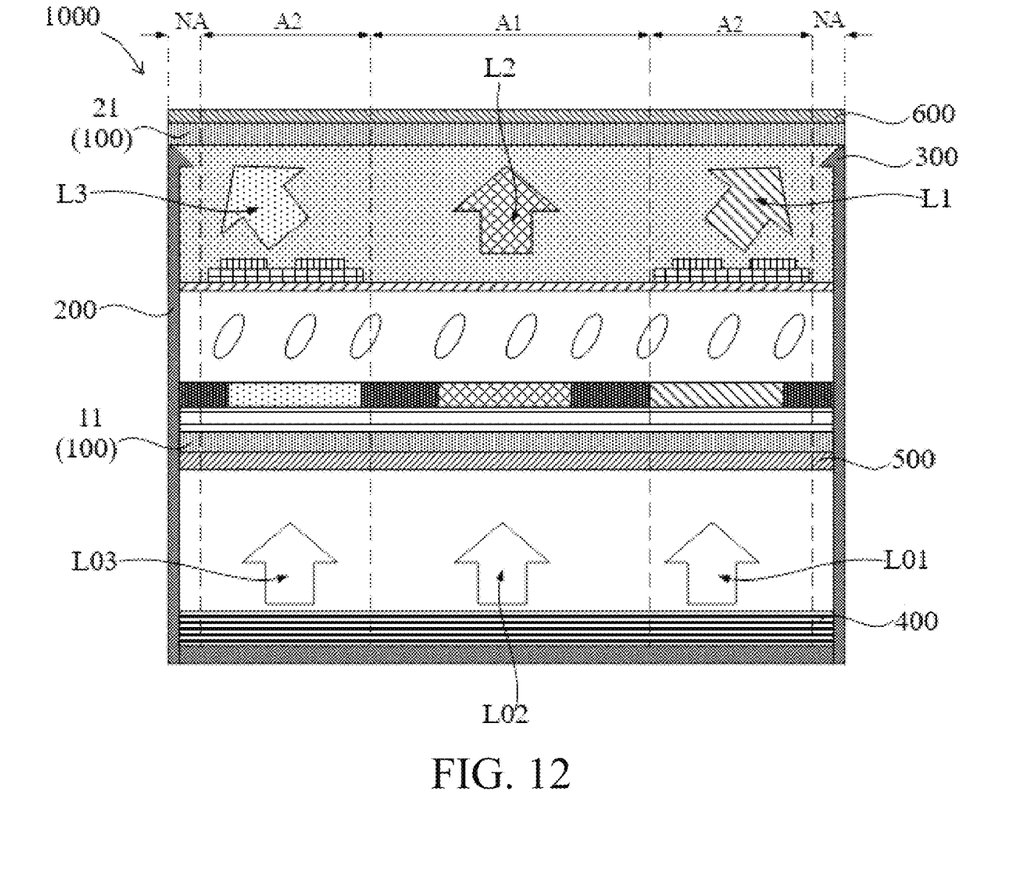
FIG. 12 is a schematic structural view of a display module according to one embodiment of the present application.

As shown in FIG. 12, this embodiment also provides a display module 1000, including a display panel 100, a frame 200, and a light-refracting member 300. The display panel 100 is placed inside the frame 200, and the light-refracting member 300 is located on the frame 200 and positioned in the non-display area NA. At least part of the light emitted from the peripheral display area A2 is refracted by the light-refracting member 300 and then emerges from the non-display area NA. The light-refracting member 300 can be integrally formed with the frame 200 or not integrally formed with the frame 200. The light-refracting member 300 is made of alloy metal material with good light refraction properties to deflect the light emitted from the peripheral display area into the non-display area NA.

Figure 13:
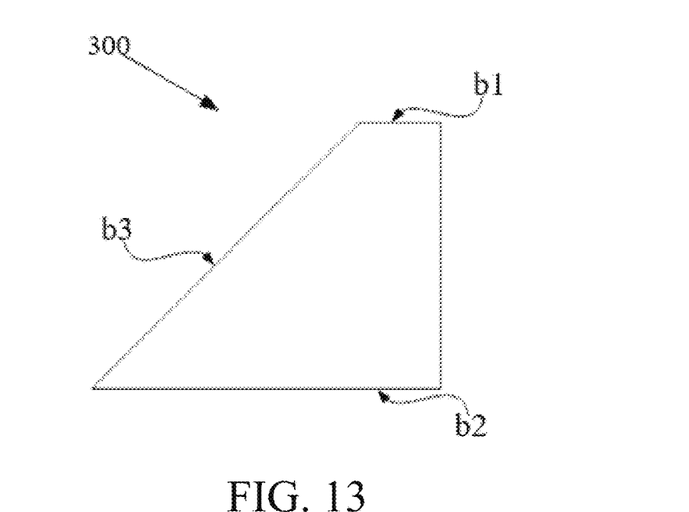
FIG. 13 is a cross-sectional view of a light-refracting member in FIG. 12, perpendicular to the third direction.

As shown in FIG. 13, a cross-section of the light-refracting member 300, perpendicular to a third direction, is trapezoidal. The third direction is the extension direction of the light-refracting member 300, which extends along the boundary line between the peripheral display area A2 and the non-display area NA, i.e., the third direction is a direction along the boundary line between the peripheral display area A2 and the non-display area NA. A size range of a top edge b1 of the trapezoid is 0.5 millimeters to 1.5 millimeters (mm), with specific sizes such as 0.5 mm, 0.6 mm, 0.7 mm, 0.8 mm, 0.9 mm, 1.0 mm, 1.1 mm, 1.2 mm, 1.3 mm, 1.4 mm, and 1.5 mm. A size range of a bottom edge b2 of the trapezoid is 3 millimeters to 5 millimeters (mm), with specific sizes such as 3.0 mm, 3.5 mm, 4.0 mm, 4.5 mm, and 5.0 mm. A size of a first side edge b3, which connects the top and bottom edges and is closer to the display panel 100, is not limited and is determined based on an angle between the first side edge b3 and the bottom edge b2. By adjusting the angle between the first side edge b3 and the bottom edge b2, a deflection direction of the light incident on a surface of the light-refracting member 300 at the first side edge b3 is controlled. Similarly, the cross-section of the light-refracting member 300, perpendicular to the third direction, can also be a trapezoidal-like, triangular, or triangular-like shape.

The display module 1000 also includes a backlight source 400, located within the frame 200 and positioned on one side of the array substrate 10 of the display panel 100 away from the counterpart substrate 20. Since the liquid crystal layer 30 in the display panel 100 does not emit light, the display panel 100 requires the backlight source 400 to provide light for display.

The display module 1000 also includes a lower polarizing plate 500 and an upper polarizing plate 600. Both the lower polarizing plate 500 and the upper polarizing plate 600 are located within the frame 200. The lower polarizing plate 500 is positioned between the backlight source 400 and the display panel 100, and the upper polarizing plate 600 is arranged on one side of the display panel 100 away from the backlight source 400. FIG. 12 shows a case where the backlight source 400 is a direct-type backlight source, with L01 and L03 showing paths of backlight emission from the peripheral display area A2 to the display panel 100, and L02 showing a path from the central display area A1 to the display panel 100. In FIG. 12, L1 and L3 show polarization paths of the light emitted from the peripheral display area A2 after passing through the meta-surface structure layer 22, and L2 shows a path of the light from the central display area A1 without passing through the meta-surface structure layer 22.

By arranging the light-refracting member 300 on the frame 200, the display module 1000 provided in this embodiment uses the light-refracting member 300 to deflect at least part of the light emitted from the peripheral display area A2 of the display panel 100 and then emerge from the non-display area NA. This further expands the display area of the display panel 100, achieving an ultra-narrow frame for the display panel 100.

Certainly, this application can have other various embodiments. Without departing from the spirit and substance of this application, those skilled in the art can make various corresponding changes and deformations according to this application, but these corresponding changes and deformations should fall within the protection scope of the appended claims to this application.

What is claimed is:

1. A display panel, with a non-display area, a central display area, and a peripheral display area between the non-display area and the central display area, the display panel comprising:
   an array substrate;
   a counterpart substrate, arranged opposite to the array substrate; and
   a liquid crystal layer, provided between the array substrate and the counterpart substrate;
   wherein the counterpart substrate comprises a base substrate and a meta-surface structure layer, the meta-surface structure layer is disposed on one side of the base substrate close to the liquid crystal layer and is located in the peripheral display area, and at least part of light emitted from the peripheral display area is deflected by the meta-surface structure layer and then emerges from the non-display area;
   wherein the peripheral display area comprises a first peripheral sub-display area and a second peripheral sub-display area between the central display area and the first peripheral sub-display area;
   the meta-surface structure layer comprises a plurality of meta-surface structure units, each of the meta-surface structure units comprises a deflection angle relative to a first direction, the first direction is a direction perpendicular to a second direction, the second direction is a direction along a boundary line between the central display area and the second peripheral sub-display area;
   along a direction from the second peripheral sub-display area to the first peripheral sub-display area, the deflection angles of the meta-surface structure units located in the first peripheral sub-display area gradually increase; and
   along a direction from the first peripheral sub-display area to the second peripheral sub-display area, the deflection angles of the meta-surface structure units located in the second peripheral sub-display area gradually increase.

2. The display panel according to claim 1, wherein the counterpart substrate comprises a counterpart electrode layer;
   the counterpart electrode layer is disposed on one side of the meta-surface structure layer away from the base substrate, or the counterpart electrode layer is disposed on one side of the meta-surface structure layer close to the base substrate.

3. The display panel according to claim 1, wherein in the first peripheral sub-display area, the deflection angles of the meta-surface structure units located in a same column are equal; and/or in the second peripheral sub-display area, the deflection angles of the meta-surface structure units located in a same column are equal;

wherein the meta-surface structure units in the same column are arranged along the second direction.

4. The display panel according to claim 1, wherein along the first direction, an absolute difference in the deflection angles between each two neighboring meta-surface structure units are equal.

5. The display panel according to claim 1, wherein along the second direction, the meta-surface structure units are arranged at equal intervals; and/or along the first direction, the meta-surface structure units are arranged at equal intervals; and/or the meta-surface structure units are arranged axially symmetrically with respect to a boundary line between the first peripheral sub-display area and the second peripheral sub-display area.

6. The display panel according to claim 1, wherein a cross-section of each of the meta-surface structure units, parallel to a plane where the display panel is located, is rectangular-shaped, and/or a cross-section of each of the meta-surface structure units, parallel to the plane where the display panel is located, is in a shape of two perpendicularly intersecting rectangles.

7. The display panel according to claim 6, wherein the meta-surface structure units comprise a plurality of first meta-surface sub-units and a plurality of second meta-surface sub-units; a cross-section of each of the first meta-surface sub-units, parallel to the plane where the display panel is located, is rectangular-shaped; a cross-section of each of the second meta-surface sub-units, parallel to the plane where the display panel is located, is in a shape of two perpendicularly intersecting rectangles; along the second direction, at least one of the first meta-surface sub-unit and at least one of the second meta-surface sub-units are alternately arranged at intervals; and along the first direction, the cross-sections of the meta-surface structure units are either all rectangular-shaped or all in the shape of two perpendicularly intersecting rectangles.

8. A display module, comprising:

a display panel, with a non-display area, a central display area, and a peripheral display area between the non-display area and the central display area, wherein the display panel comprises an array substrate, a counterpart substrate arranged opposite to the array substrate, and a liquid crystal layer disposed between the array substrate and the counterpart substrate, wherein the counterpart substrate comprises a base substrate and a meta-surface structure layer, the meta-surface structure layer is disposed on one side of the base substrate close to the liquid crystal layer and is located in the peripheral display area, and at least part of light emitted from the peripheral display area is deflected by the meta-surface structure layer and then emerges from the non-display area; and a frame and a light-refracting member, wherein the display panel is disposed inside the frame, the light-refracting member is positioned on the frame and located in the non-display area, at least part of the light emitted from the peripheral display area emerges from the non-display area after being deflected by the light-refracting member.

9. The display module according to claim 8, wherein the light-refracting member extends along a third direction; the third direction is a boundary line between the peripheral display area and the non-display area; and a cross-sectional shape of the light-refracting member, perpendicular to the third direction, is at least one of triangular, triangular-like, trapezoidal, or trapezoidal-like.

10. The display module according to claim 9, wherein when the cross-sectional shape of the light-refracting member, perpendicular to the third direction, is trapezoidal, and an angle between a first side edge and a bottom edge of the light-refracting member is adjusted to control a deflection direction of light rays incident on a surface of the light-refracting member at the first side edge.

11. The display module according to claim 8, wherein the light-refracting member is integrally formed with or assembled to the frame, and the light-refracting member is made of metal or alloy material, for deflecting the light emitted from the peripheral display area into the non-display area.

12. The display module according to claim 8, further comprising a backlight source, wherein the backlight source is located within the frame and is positioned on one side of the array substrate of the display panel that is away from the counterpart substrate.

13. The display module according to claim 8, wherein the counterpart substrate comprises a counterpart electrode layer;

the counterpart electrode layer is disposed on one side of the meta-surface structure layer away from the base substrate, or the counterpart electrode layer is disposed on one side of the meta-surface structure layer close to the base substrate.

14. The display module according to claim 8, wherein the peripheral display area comprises a first peripheral sub-display area and a second peripheral sub-display area between the central display area and the first peripheral sub-display area;

the meta-surface structure layer comprises a plurality of meta-surface structure units, each of the meta-surface structure units comprises a deflection angle relative to a first direction, the first direction is a direction perpendicular to a second direction, the second direction is a direction along a boundary line between the central display area and the second peripheral sub-display area;

along a direction from the second peripheral sub-display area to the first peripheral sub-display area, the deflection angles of the meta-surface structure units located in the first peripheral sub-display area gradually increase; and along a direction from the first peripheral sub-display area to the second peripheral sub-display area, the deflection angles of the meta-surface structure units located in the second peripheral sub-display area gradually increase.

15. The display module according to claim 14, wherein in the first peripheral sub-display area, the deflection angles of the meta-surface structure units located in a same column are equal; and/or in the second peripheral sub-display area, the deflection angles of the meta-surface structure units located in a same column are equal;

wherein the meta-surface structure units in the same column are arranged along the second direction.

16. The display module according to claim 14, wherein along the first direction, an absolute difference in the deflection angles between each two neighboring meta-surface structure units are equal.

17. The display module according to claim 14, wherein along the second direction, the meta-surface structure units are arranged at equal intervals; and/or along the first direction, the meta-surface structure units are arranged at equal intervals; and/or the meta-surface structure units are arranged axially symmetrically with respect to a boundary line between the first peripheral sub-display area and the second peripheral sub-display area.

18. The display module according to claim 14, wherein a cross-section of each of the meta-surface structure units, parallel to a plane where the display panel is located, is rectangular-shaped, and/or a cross-section of each of the meta-surface structure units, parallel to the plane where the display panel is located, is in a shape of two perpendicularly intersecting rectangles.

19. The display module according to claim 18, wherein the meta-surface structure units comprise a plurality of first meta-surface sub-units and a plurality of second meta-surface sub-units; a cross-section of each of the first meta-surface sub-units, parallel to the plane where the display panel is located, is rectangular-shaped; a cross-section of each of the second meta-surface sub-units, parallel to the plane where the display panel is located, is in a shape of two perpendicularly intersecting rectangles; along the second direction, at least one of the first meta-surface sub-unit and at least one of the second meta-surface sub-units are arranged at intervals; and along the first direction, the cross-sections of the meta-surface structure units are either all rectangular-shaped or all in the shape of two perpendicularly intersecting rectangles.

\* \* \* \* \*